United States Patent [19]
Kilham

[11] 4,361,116
[45] Nov. 30, 1982

[54] WINDOW BIRD FEEDER

[76] Inventor: Peter Kilham, Box 98, Mill Rd., Foster, R.I. 02825

[21] Appl. No.: 231,581

[22] Filed: Feb. 2, 1980

[51] Int. Cl.³ ............................................. A01K 39/00
[52] U.S. Cl. ................................................. 119/51 R
[58] Field of Search ...................... 119/51 R, 52 R, 26, 119/23; 411/424, 417

[56] References Cited

U.S. PATENT DOCUMENTS

| | | | |
|---|---|---|---|
| 1,967,145 | 7/1934 | Fisher | 411/417 |
| 2,720,188 | 10/1955 | Hofrichter | 119/26 |
| 3,134,361 | 5/1964 | Decker | 119/53 |
| 3,291,100 | 12/1966 | Negaard | 119/51 R |
| 4,030,451 | 6/1977 | Miller | 119/51 R |

FOREIGN PATENT DOCUMENTS

915480 1/1963 United Kingdom ............. 119/51 R

Primary Examiner—Hugh R. Chamblee
Attorney, Agent, or Firm—Salter & Michaelson

[57] ABSTRACT

A universal window bird feeder having a dish portion and a hood portion spaced thereabove with an elongated rod of non-circular section extending therebetween. Apertures on the hood and dish portions cooperate with said rod to non-rotatably mount said portions thereon. Bracket means are provided for either suspending or for supporting the feeder from beneath the dish portion. Alternative suction cup means are provided for mounting the feeder on a window surface.

15 Claims, 15 Drawing Figures

WINDOW BIRD FEEDER

BACKGROUND OF THE INVENTION

The instant invention is directed to feeders for birds and the like and more particularly to a hooded feeder for birds which is mountable adjacent to the exterior surface of a window.

Heretofore, hooded bird feeders have been available in various configurations for mounting in various locations, and in this regard particular reference is made to U.S. Pat. to Miller No. 4,030,451, this being the closest prior art of which the applicant is aware. Other patents of note are the applicant's prior U.S. Pat. Nos. 3,568,641; 3,913,527; and 4,102,308.

While the feeding of birds and the like has for sometime captured the interest of many persons solely on the basis of a desire to assist wild birds in their search for food, the feeding of birds can have an added dimension when the birds may be closely observed in their feeding. Although it is generally possible to observe birds during feeding with conventional bird feeders, man's natural curiosity makes it desirable to observe birds as closely as possible. Accordingly, it is desirable to provide a bird feeder which is mountable adjacent to the exterior surface of a window, whereby the birds may be closely observed while feeding. The instant invention provides a novel bird feeder which is universally adaptable for mounting adjacent the exterior surface of a window. The feeder of the instant invention may be mounted on a window casing, a window frame, a window sill, or directly on the surface of a window in closely spaced relation thereto. It has been found therefore that the feeder of the instant invention stimulates new and increased interest in the feeding of birds, as a result of the added dimension of being able to observe the birds at close range during feeding. In addition, the feeder of the instant invention is suitable for use in even the most urban locations where conventional bird feeders would otherwise be impractical since it is adaptable for mounting adjacent to virtually any window.

SUMMARY OF THE INVENTION

The instant invention is related to a feeder for birds and the like and more particularly to a hooded window bird feeder of great versatility in that it is universally adaptable for mounting on a window casement or frame, on a window sill, or directly on the surface of a window. The feeder of the instant invention comprises a substantially horizontal feeder dish with a substantially horizontal hood spaced thereabove. A substantially vertical elongated threaded rod of non-circular section is provided extending between the hood and the dish. Elongated posts or hubs extend downwardly from the hood and upwardly from the dish, each of said posts having apertures of substantially the same sectional configuration as the elongated rod extending longitudinally therethrough. Accordingly, the elongated rod is freely receivable within the apertures in a non-rotatable manner and a plurality of threaded nuts are provided for securing the vertical positions of the dish and the hood on the rod to fix their relative spacing.

Since the rod and apertures are of non-circular section and hence non-rotatable with respect to each other, the hood and the dish are likewise non-rotatable relative to each other. Consequently, the feeder may be formed in non-circular configuration with the hood and the dish each having a substantially flat vertical side wall which is positionable adjacent to the surface of a window. The hood and the dish will remain in alignment with the side walls thereof remaining relatively co-planar as a result of being non-rotatable on the rod thereby making the feeder particularly suited for positioning adjacent the surface of window.

Several means are provided for mounting the feeder of the instant invention adjacent to the surface of a window. The feeder may be suspended from above with a mounting bracket positioned on the casement or window frame or the feeder may be supported from beneath with a mounting bracket positioned on the sill of a window. Alternatively, the feeder may be mounted directly on the surface of the window with suction cup brackets.

It is therefore an object of the instant invention to provide a bird feeder having a feeder dish with a dome or hood positioned thereabove, the dish and the dome each having at least one substantially flat vertical side wall which is positionable adjacent the surface of a window.

Another object of the instant invention is to provide a bird feeder which is adaptable for universal mounting adjacent to the surface of a window.

Another object of the instant invention is to provide a window bird feeder which may be mounted on the casement or frame of a window.

A further object of the instant invention is to provide a bird feeder which is mountable on the sill of a window.

A still further object of the instant invention is to provide a window bird feeder which is mountable with suction cups directly on the surface of a window.

A still further object is to provide a window bird feeder to thereby permit the close range viewing of birds during feeding.

Other objects, features and advantages of the invention shall become apparent as the description thereof proceeds when considered in connection with the accompanying illustrative drawings.

DESCRIPTION OF THE DRAWING

In the drawings which illustrate the best mode presently contemplated for carrying out the present invention.

DESCRIPTION OF THE INVENTION

Figures 1, 2, 3:
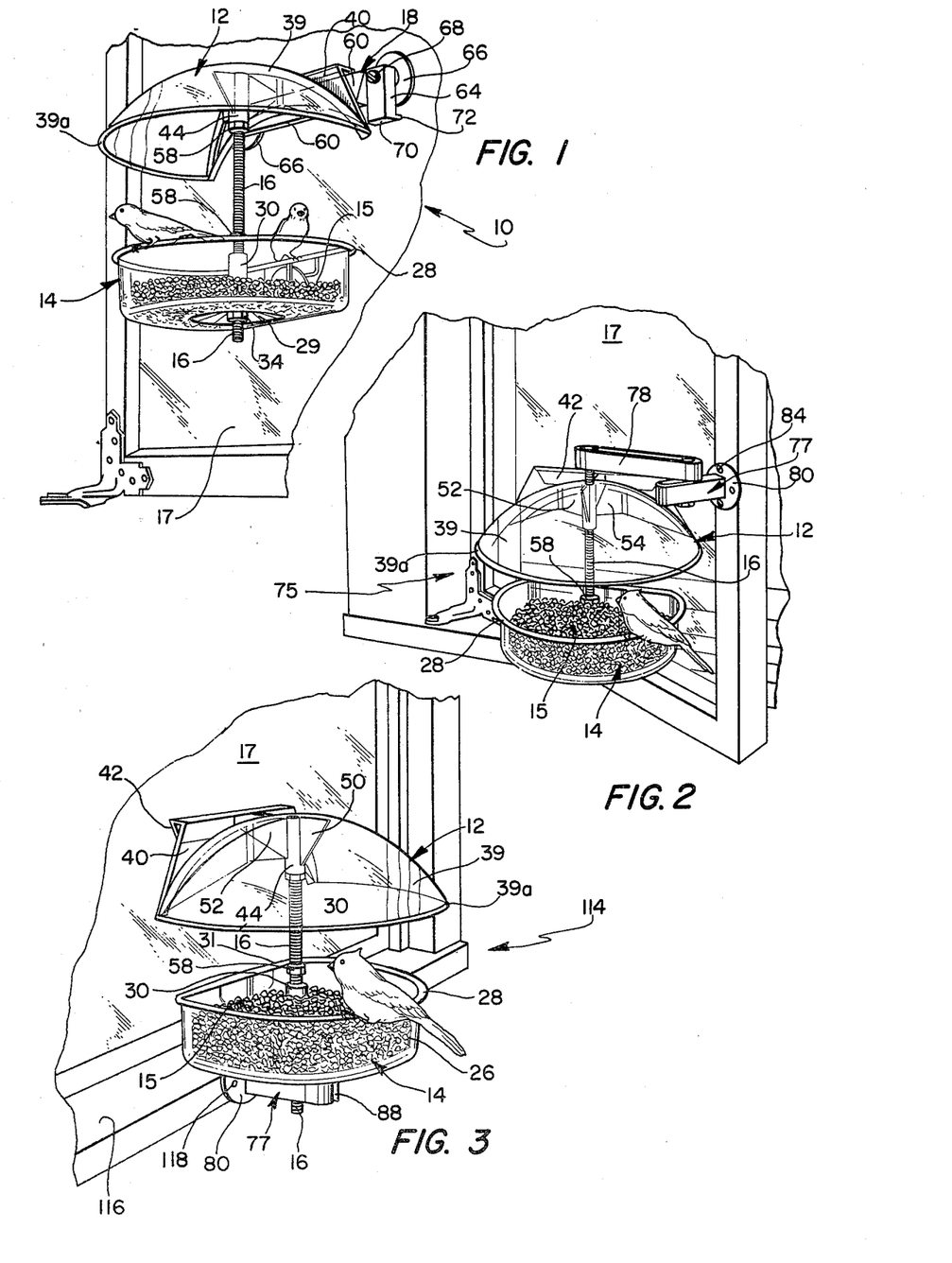
FIG. 1 is a perspective view of the bird feeder of the instant invention mounted on the exterior surface of a window by means of an improved suction cup bracket assembly.
FIG. 2 is a perspective view of the window bird feeder of the instant invention suspended adjacent to the exterior surface of a window by means of an improved mounting bracket assembly mounted on the casement of the window.
FIG. 3 is a perspective view of the window bird feeder of the instant invention, the feeder being supported from beneath by means of an improved mounting bracket assembly mounted on the window sill.
Figure 6:
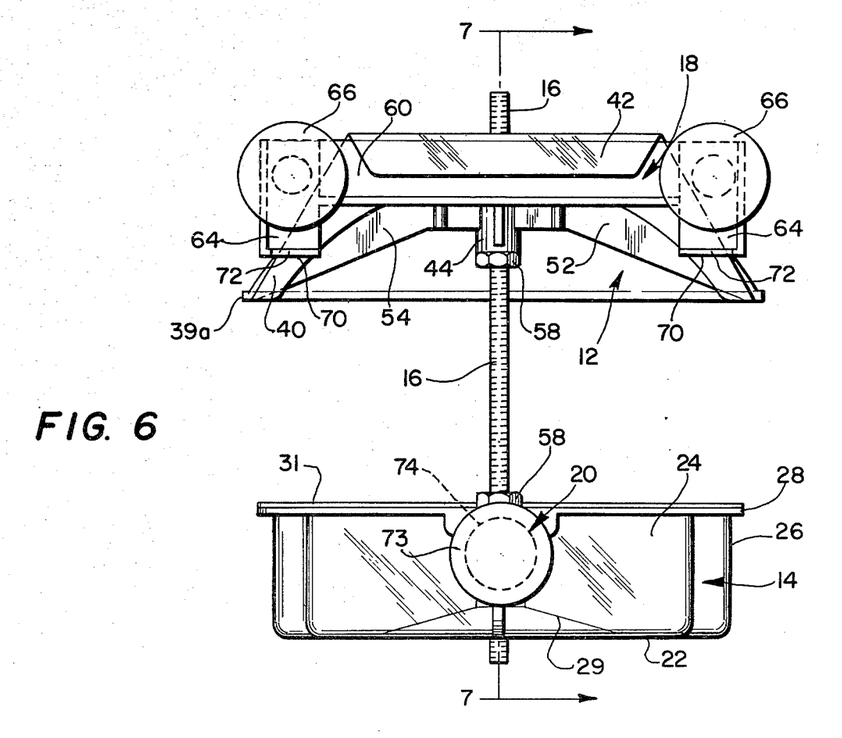
FIG. 6 is a rear elevational view of the window bird feeder of the instant invention in combination with the suction cup mounting brackets.
Figure 7:
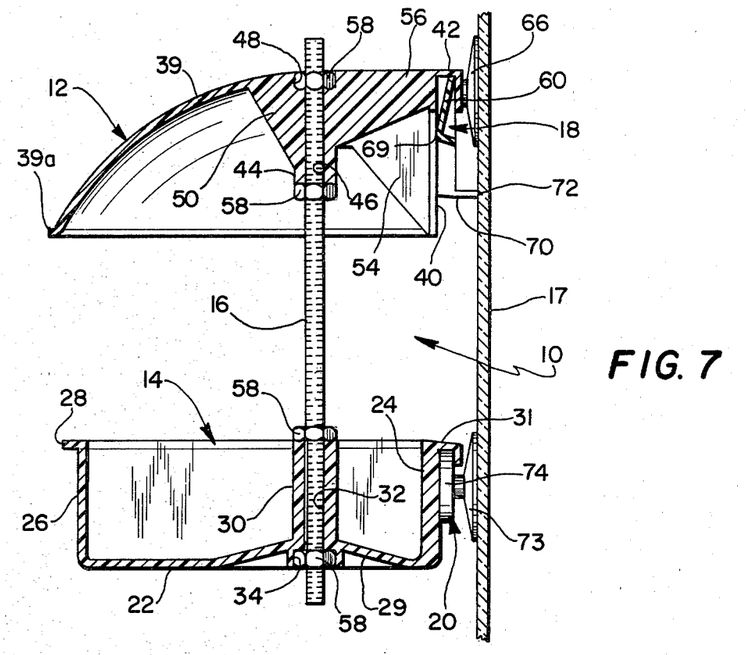
FIG. 7 is a sectional view taken along line 7—7 in FIG. 6.

Referring now to the drawing, the window bird feeder of the instant invention as embodied with suction cup brackets and mounted adjacent to the exterior surface of a window is shown in FIGS. 1, 6 and 7 and is generally indicated at 10. As will be noted, the feeder 10 comprises a substantially horizontal hood member 12 and a substantially horizontal dish member 14 with a substantially vertical elongated rod 16 of non-circular section therebetween. In order to mount the feeder 10 on the surface of a window 17, upper and lower suction cup brackets 18 and 20, respectively, are provided. Preferably the hood member 12, the dish member 14, and the brackets 18 and 20 (exclusive of the actual suction cups) will be made of molded Lexan which is a light, durable, attractive, transparent plastic material, although certainly other suitable materials may be used.

Referring particularly to FIGS. 1 and 7, it will be noted that the dish member 14 is of substantially open dish configuration suitable for containing a feed material 15 and is defined by a base 22 with a substantially flat vertical rear wall 24 and substantially arcuate vertical front wall 26 upstanding therefrom. An outwardly extending lip 28 is provided around the upper periphery of the front wall 26 to add rigidity to the dish member 14. As will be noted, extending rearwardly from the upper periphery of the rear wall 24 is a dish member mounting hook 30, the hook 30 extending rearwardly and then downwardly and being engageable with the lower suction cup bracket 20 to support the dish member 14 on the window 17. The bottom wall 22 of the dish member 14 is substantially flat with a raised area 29 formed centrally therein. An elongated post or hub 31 extends upwardly in substantially vertical disposition from the central portion of the raised area 29 and an elongated aperture 32 is provided extending through the post 31 and the bottom wall 22. As will be noted, a socket 34, formed to receive a hexagonal nut in a non-rotatable manner, extends downwardly from the central portion of the raised area 29.

As hereinbefore stated, the hood member 12 is spaced above the dish member 14 and is substantially horizontally disposed. As will be seen most clearly in FIGS. 1 and 7, the hood member 12 is of substantially circular dome configuration with the front dome portion 39 having a peripheral lip 39a for added rigidity and a substantially flat vertical foreshortened rear wall 40. As will be further noted, the upper portion of the rear wall 40 terminates in a hook portion 42 which extends rearwardly and downwardly and is engageable with the suction cup bracket 18 to thereby support the hood member 12 on the window 17. Extending downwardly in substantially vertical disposition from the central portion of the hood member 12 is an elongated post or boss 44 having an aperture 46 extending therethrough. An upper socket 48, formed to receive a hexagonal nut in a non-rotatable manner, is provided in the hood member 12 above the aperture 46. A forwardly extending gusset 50 and a pair of diagonally rearwardly extending gussets 52 and 54 provide support for the post 44 within the hood member 12. A rear hook portion gusset 56 is provided extending rearwardly from the central portion of the dome portion 39 being adjoined to the upper portion of the rear wall 40 to provide additional strength therefore as well as for the hook portion 42.

As hereinbefore stated, an elongated threaded rod 16 extends between the hood member 21 and the dish member 14, which rod preferably is made of brass or some other suitable rigid, corrosion resistant material and is of substantially square section. The apertures 32 and 46 are also of substantially square section, being dimensioned slightly larger than the rod 16 whereby the latter is freely but non-rotatably received in the apertures 32 and 44. The sectional configuration of the apertures 32 and 46 may be noted particularly in FIGS. 8A and 8B whereas the preferred configuration of the rod 16 may be best seen in FIG. 10.

As a result of the substantially square cross-sectional configuration of the elongated rod 16 and the apertures 32 and 44, the hood member 12 and the dish member 14 are non-rotatable relative to the rod 16 and hence relative to each other. Accordingly, the hood member 12 and the dish member 14 are formed and dimensioned so that when properly oriented, the rear walls 24 and 40 will be substantially co-planar while the apertures 32 and 46 will be in substantially vertical alignment with the hood member 12 providing a cover positioned substantially over the dish member 14. To affix the positions of the hood member 12 and the dish member 14 on the rod 16, a plurality of threaded hexagonal nuts 58 are provided. As will be noted, the nuts 58 are positionable above and below the posts 31 and 44 with the nut 58 positioned beneath the dish member 14 being received in the socket 34 and the nut 58 positioned above the hood member 12 being received in the socket 48.

Figures 7A, 7B:
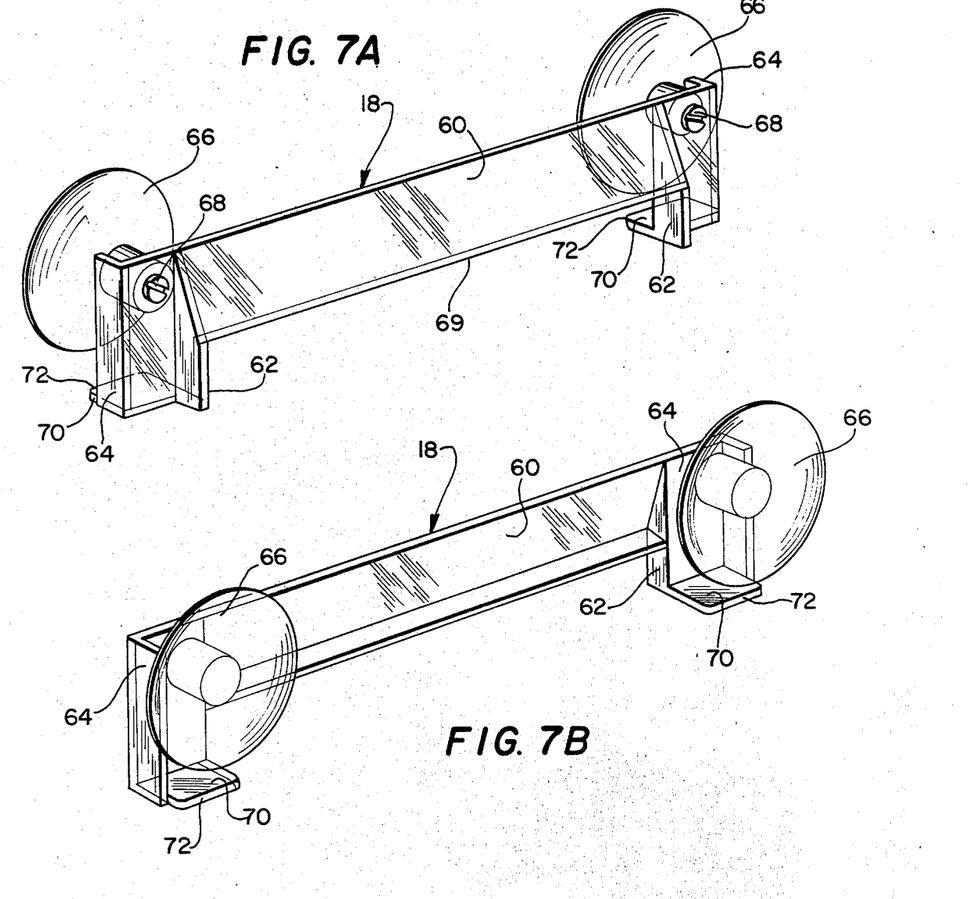
FIG. 7A is a front perspective view of the upper suction cup bracket used for mounting the window feeder on the surface of a window.
FIG. 7B is a rear perspective view thereof.

The upper suction cup bracket 18 is illustrated particularly in FIGS. 7A and 7B and comprises a substantially horizontally disposed rearwardly facing L-shaped member 60 which is inclined slightly downwardly and outwardly as shown with vertically disposed end portions 62 attached thereto as shown. Vertical angle members 64 are attached to the ends 62, also as shown, with a pair of suction cups 66 of conventional construction being attached to the upper portions of the angle members 64 by any conventional means such as screws 68, the suction cups 66 extending rearwardly for suctioned engagement with a substantially vertical supporting surface therebehind. A pair of horizontal plates or fulcrums 70 are attached to the bottom ends of the angle members 64 and are spaced below the lower periphery of the suction cups 66 extending rearwardly substantially to the vertical plane of the suction cups 66. Accordingly, when the bracket 18 is mounted on the window 17, as will be noted particularly from FIG. 7, with the suction cups 66 in suctioned engagement therewith, the hook portion 42 of the hood member 12 engages the L-shaped member 60 at the upper edge thereof while rear wall 40 engages the angle or corner 69, while at the same time the rear edges of the plates or fulcrums 70 engage the window 17 as at 72. Consequently, when a downward force is applied to the outer portion of the hood member 12, the resultant force on suction cups 66 will be applied on the central axis of the suction cups 66 and will be substantially normal to the surface 17 tending to pull the suction cups 66 straight outwardly from the surface 17. Since one of the inherent characteristics of suction cups is that they can withstand substantial forces when the forces are perpendicular to the axis thereof, but will tend to be separable from a supporting surface when the forces are applied at an angle to the central axis thereof, the configuration of the bracket 18 with the bottom plates 72 provides a much more secure mounting for the hood member 12 in that the suction cups 66 will not easily be accidently dislodged from the surface 17.

The dish member suction cup bracket 20 is illustrated in FIGS. 6 and 7. It will be noted that the bracket 20 comprises a single suction cup 73 engageable with the surface 17, with bracket portion 74 extending outwardly from the cup 73 and being engageable with the hook 30 to support the dish member 14.

Figure 4:
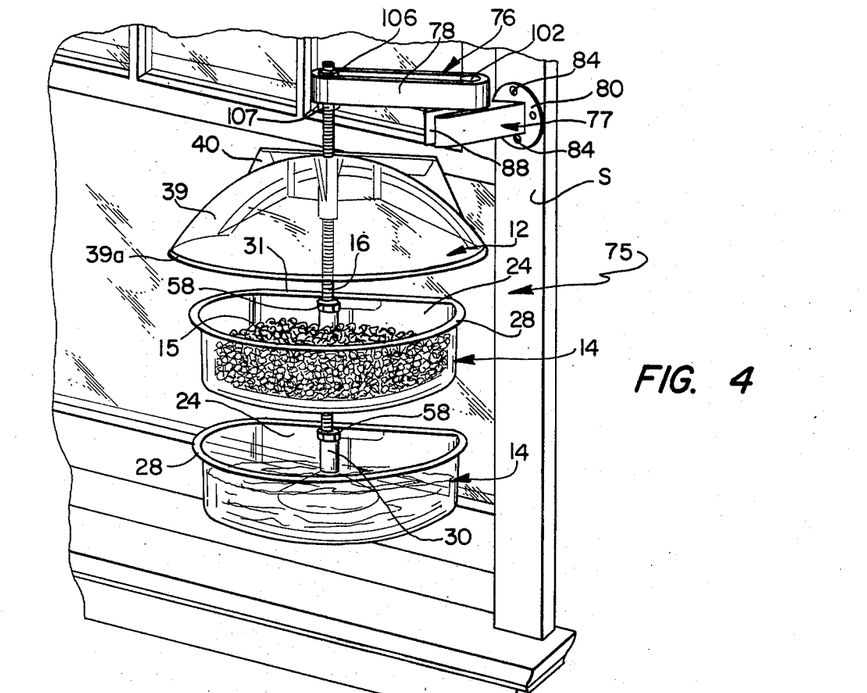
FIG. 4 is a perspective view of the window bird feeder illustrating the adjustability of the spacing between the hood and the feeder dish when the feeder is suspended from above.
Figures 8, 8A, 8B, 8C, 9, 10:
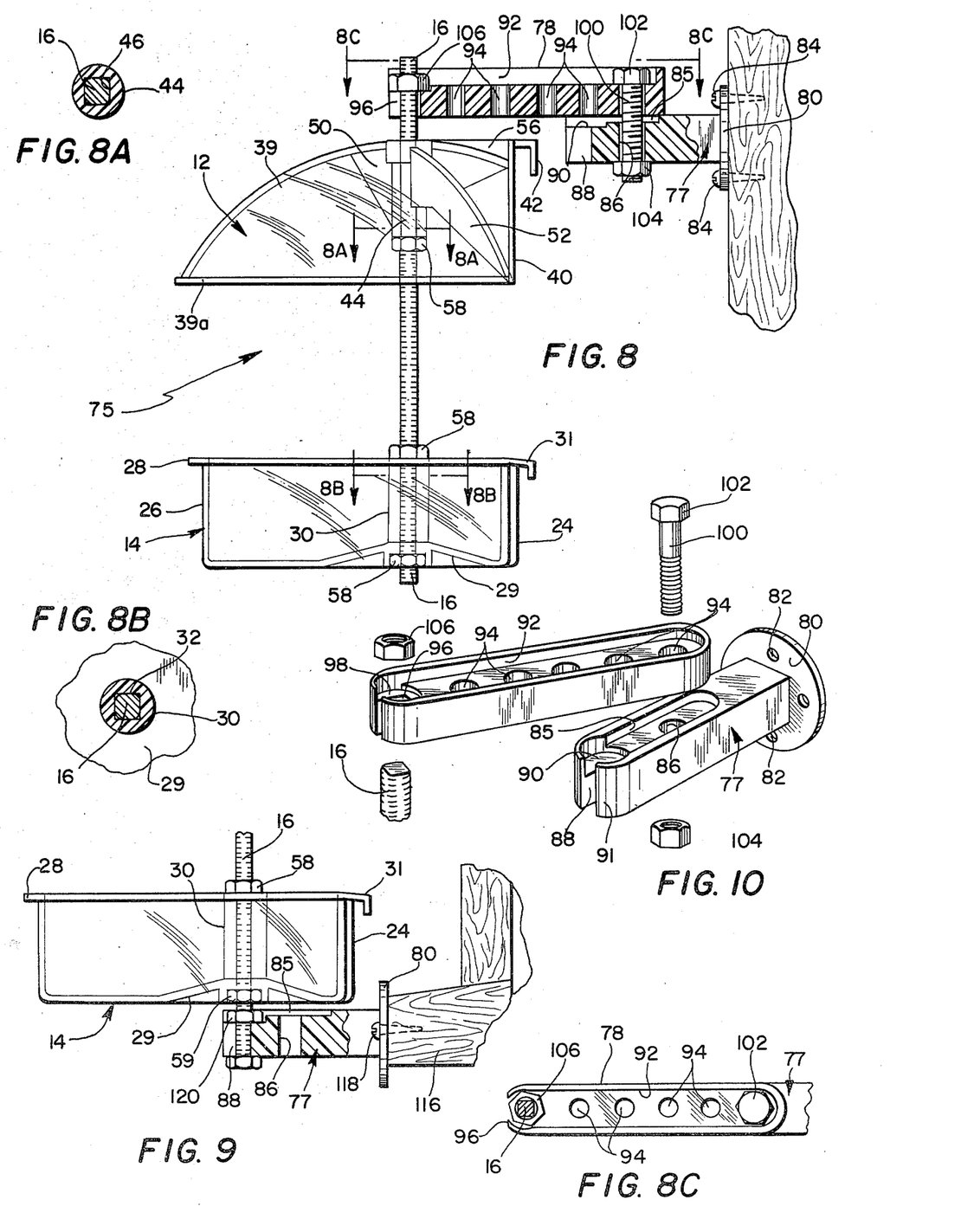
FIG. 8 is a side elevational view of the window bird feeder as embodied with a hanger bracket suspending the feeder in front of a surface of a window, the bracket being shown partially in section.
FIG. 8A is a sectional view taken along line 8A—8A in FIG. 8.
FIG. 8B is a sectional view taken along line 8B—8B in FIG. 8.
FIG. 8C is a sectional view taken on line 8C—8C in FIG. 8 with the supporting bracket shown in top plan.
FIG. 9 is a side elevational view of the dish of the feeder supported from beneath with a bracket which is shown partially in section.
FIG. 10 is an exploded perspective view of the mounting bracket for suspending or supporting the feeder.

A second embodiment of the bird feeder of the instant invention is shown in FIGS. 2, 4 and 8 and is generally indicated at 75. As will be noted, the feeder 75 is of substantially the same configuration as the feeder 10 having a dish member 14 an elongated rod 16 and a hood member 12 with the positions of the dish member 14 and the hood member 12 on the rod 16 being adjustably fixed with a plurality of threaded hexagonal nuts 58. However, the feeder 75 includes a mounting bracket generally indicated at 76 which is securable to the rod 16 above the hood member 12 to mount the feeder 75 on a supporting surface S, generally the casement or frame of a window. The mounting bracket 76 which is preferably made of a rigid corrosion resistant material such as RYNITE (Dupont Trademark) is best illustrated in FIGS. 8A and 10 and comprises a main bracket 77 and an extension bracket 78. The main bracket 77 comprises a horizontal bar 79 with a substantially vertical circular face plate 80 attached to one end thereof. A plurality of small holes 82 are positioned on the plate 80 spaced around the bar 79 for mounting the bracket 77 on the supporting surface S with screws 84, as shown in FIG. 8. A channel 85 is provided on the top of the bar 79 and is dimensioned to receive the hexagonal head of a bolt in a non-rotatable manner, a hole 86 being provided extending through the bar 79 and communicating with the channel 85. A substantially rectangular vertical slot 88 is provided extending inwardly from the outer end of the bar 79 with the transverse dimension of the slot 88 being slightly greater than the cross-sectional dimension of the rod 16 whereby the rod 16 is receivable in the slot 88 in a non-rotatable manner. A substantially circular recess 90 is provided at the top of the slot 88 and as will be noted, the side walls of the bar 79 are curved inwardly at the ends thereof as at 91 to define the entrance to the slot 88. The extension bracket 78 is of a construction similar to that of bar 79 but is substantially longer.

Figure 5:
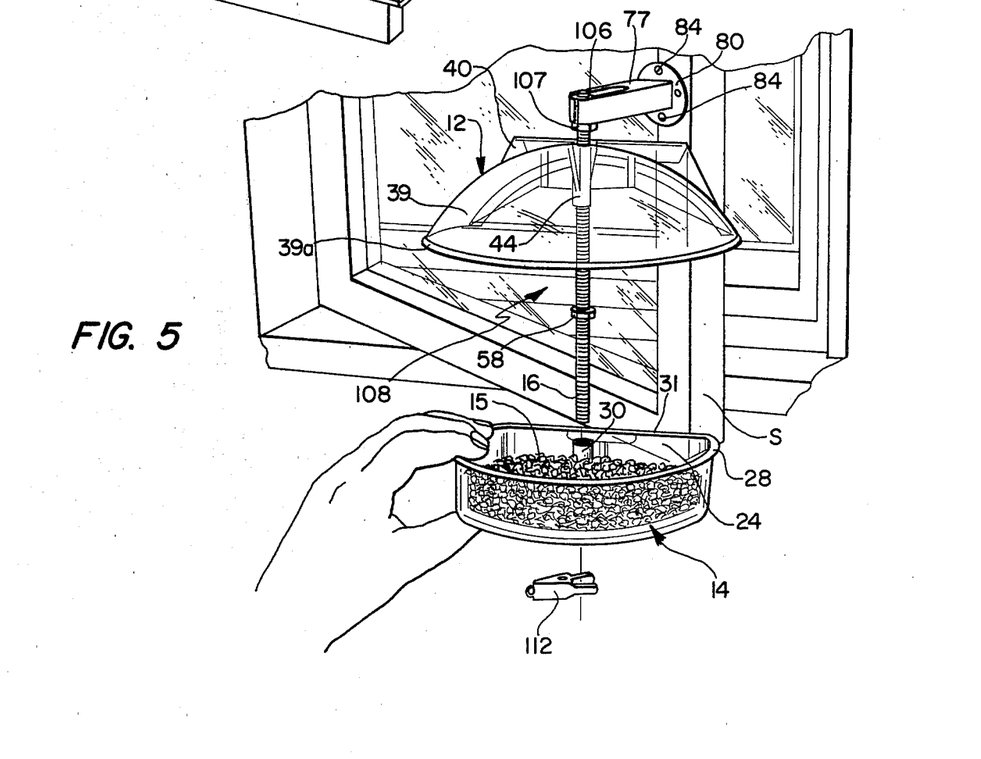
FIG. 5 is a perspective view illustrating the removal of the feeder dish for filling when the assembly is suspended from above.

As will be noted, the bracket 78 has a channel 92, also dimensioned to receive the hexagonal head of a bolt in a non-rotatable manner, on the top side thereof with a plurality of holes 94 extending vertically through the bracket 78 in the channel 92 and spaced therealong. A substantially vertical rectangular slot 96 is provided extending inwardly from the outer end of the bracket 78 and a substantially circular recess 98 is provided above the slot 96. To mount the feeder 75 as shown in FIG. 2, the brackets 77 and 78 are used in combination with a bolt 100 having a head 102 which is received in one of the holes 94 in the extension bracket 78 and in the hole 86 in the main bracket 77 with the head 102 being non-rotatably received in the channel 92. A nut 104 is provided to secure the brackets 77 and 78 together in the orientation desired. Alternatively the extension bracket 78 is mountable beneath the main bracket 77 with the head 102 being received in the channel 85 and the bolt 100 extending first through the hole 86 and then through one of the holes 94. To support the feeder, the top end of the rod 16 is received in the slot 96 and a hexagonal nut 106 threadedly engaging the top end of the rod 16 and being received in captured engagement in the recess 98 with a nut 107 preferably being positioned beneath the bracket 78 on the rod 16 as shown in FIGS. 4 and 5 Accordingly, the rod 16 with the dish member 14 and the hood member 12 are suspended from the bracket 76 in a non-rotatable manner as a result of the substantially square configuration of the rod 16 and the substantially rectangular configuration of the slot 96. The orientation of the feeder 76 relative to the supporting surface or window can be adjusted by loosening the nut 104 to rotate the bracket 78 relative to the bracket 77. For major adjustments in the orientation of the feeder 75, the orientation of the rod 16 and the slot 96 may be changed in increments of substantially 90°.

As will be noted in FIG. 5, a third embodiment of the instant invention is indicated at 108. The feeder 108, as will be noted, is substantially the same as the feeder 75 with the exception that the rod 16 is secured directly to the main bracket 77 with the extension bracket 78 not being used. In this case the rod 16 is received in the slot 88 and the threaded hexagonal nut 106 is received in captured engagement in the recess 90 with the nut 107 being positioned beneath the bracket 77 on the rod 16.

It will be noted that in both the feeder 108 and the feeder 75 and with the rod 16 being suspended from above, the most convenient method of filling the dish member 14 will be to remove it from the rod 16. Accordingly, while the positions of the hood member 12 and the dish member 14 relative to the rod 16 may be fixed with hexagonal nuts 58, as an alternative an alligator clip 112 may be provided to vertically support the dish member on the rod 16 in an easily removable manner, as will be noted in FIG. 5.

A fourth embodiment of the feeder of the instant invention is shown in FIG. 3 generally indicated at 114. It will be noted that the feeder 114 again includes the dish member 14, the rod 16 and the hood member 12. The feeder 114, however, is supported from beneath using the bracket 77 herein before described. As will be noted, particularly from FIG. 9, in this embodiment the bracket 77 is preferably mounted on the sill 116 of a window with screws or the like 118. The rod 16 is again received in the slot 88 with threaded hexagonal nuts 120 securing the rod 16 to the bracket 77, the upper nut 120 being received in the recess 90. The hexagonal nuts 58 are again used to fix the vertical positions of the dish member 14 and the hood member 12 on the shaft 16. However, in this embodiment, it is preferable not to have a hexagonal nut 58 above the hood member 12 so that the hood member 12 may be easily removed from the rod 16 to facilitate filling of dish 14.

It will be seen therefore that the feeder of the instant invention provides a versatile bird feeding apparatus which may be mounted in a number of ways adjacent to the surface of a window. As herein noted, the positions of the dish member and the hood member relative to each other are fixed as a result of the substantially square configuration of the elongated rod and the threaded hexagonal nuts positioned thereon. The feeder may be easily filled with feed material by either removing the entire feeder, when mounted with the suction cup brackets, or by removing either the dish member or the hood member as hereinbefore described. Furthermore, the light weight construction of the feeder makes it particularly adaptable for window mounting.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A feeder for birds and the like comprising:
   (a) an elongated rod of noncircular cross-section;
   (b) a substantially horizontally disposed dish member for receiving and containing feed material and the like, said dish member having a bottom wall with side walls upstanding therefrom, one of said side walls being substantially flat and substantially vertical, said dish member having a first aperture of substantially the same cross-sectional configuration as said rod extending substantially vertically therethrough, said rod being slidingly received in said first aperture in a nonrotatable manner;
   (c) a generally dome shaped hood member disposed generally horizontally in spaced relation above said dish member, said hood member having a substantially flat vertical side wall which is generally coplanar with said dish member vertical side wall, said dome member having a second aperture of substantially the same cross-sectional configuration as said rod extending substantially vertically therethrough, said rod also being slidingly received in said second aperture in a nonrotatable manner;
   (d) means longitudinally fixing the positions of said dish and hood members on said rod; and
   (e) means for supporting said feeder closely adjacent to a substantially vertical supporting surface with said vertical side walls in substantially parallel, spaced relation thereto.

2. In the feeder of claim 1, said supporting means comprising bracket means detachably connected to said supporting surface and to said rod below said dish member to support said feeder on said surface.

3. In the feeder of claim 1, said rod cross-section being substantially square.

4. The feeder of claim 1, further comprising a first post extending from said dish member in substantially vertical disposition at said aperture, said first aperture extending through said first post, and a second post extending from said hood member in substantially vertical disposition at said second aperture, said second aperture extending through said second post.

5. In the feeder of claim 1 said supporting means comprising suction cup means attached to said substantially flat vertical side walls on said hood member and said dish member for mounting said feeder on said supporting surface.

6. In the feeder of claim 5, said suction cup means being detachably secured to said side walls on said hood member and said dish member.

7. The feeder of claim 5, said suction cup means comprising:
   a. an elongated first bracket having a plurality of suction cups extending rearwardly therefrom engageable in suctioned engagement with a supporting surface therebehind;
   b. first hook means attached to said hood member engageable with said first bracket to detachably secure said hood member thereto;
   c. a second bracket having at least one suction cup extending rearwardly therefrom and being engageable in suctioned engagement with a supporting surface therebehind; and
   d. second hook means attached to said dish member engageable with said second bracket to detachably secure said dish member thereto.

8. In the feeder of claim 7, said first bracket comprising:
   a. an elongated L-shaped member;
   b. means for securing said suction cups to said member with said suction cups in substantially vertical disposition and the longer leg of said L-shaped member extending downwardly and outwardly between said suction cups, the shorter leg of said L-shaped member extending rearwardly in substantially normal disposition from the bottom end of said longer leg said hook means engaging said L-shaped member at the upper end of the longer leg thereof and at the apex thereof to detachably secure said hood member thereto.

9. The feeder of claim 7 further comprising fulcrum means attached to said first bracket engaging said surface below the lower periphery of the suction cups on said first bracket.

10. In the feeder of claim 1, said supporting means comprising bracket means detachably connected to said supporting surface and to said rod above said hood member to suspend said feeder from said surface.

11. In the feeder of claim 10, said rod being threaded, said means for fixing the positions of said hood member and said dish member on said rod comprising a plurality of threaded nuts in threaded engagement on said rod, and alligator clip means engageable with said rod beneath said dish member.

12. In the feeder of claim 10, said supporting means comprising:
   a. a first bracket mounted on the vertical supporting surface;
   b. a second bracket adjustably and detachably connected to the outer end of said first bracket to adjustably extend the length of said mounting means, said rod being detachably connected to the outer end of said second bracket.

13. In the feeder of claim 10, said rod being substantially square and threaded, said fixing means comprising a plurality of threaded nuts, said bracket means comprising an elongated arm mounted on the vertical supporting surface in substantially horizontal disposition, a generally vertical rectangular slot being formed on the outer end of said arm, the transverse dimension of said slot being slightly greater than the cross-sectional dimension of said rod, a substantially circular recess of greater peripheral dimension than said slot formed on said arm above said slot, a threaded nut also of greater peripheral dimension than said slot but of slightly smaller peripheral dimension than said recess in threaded engagement on said rod spaced above said hood member whereby said rod is non-rotatably received in said slot and said spaced nut is received in said recess securing said rod to said bracket.

14. In the feeder of claim 1, said rod being threaded, said means for fixing the positions of said dish member and said hood member on said rod comprising a plurality of threaded nuts in threaded engagement on said rod.

15. The feeder of claim 14 further comprising a first socket with a nut shaped opening therein formed on the bottom of said dish member at said first aperture, one of said nuts being non-rotatably received in said first socket and a second socket with a nut shaped second opening therein formed on the top of said hood member at said second aperture, one of said nuts being non-rotatably received in said second socket.

* * * * *

UNITED STATES PATENT AND TRADEMARK OFFICE
CERTIFICATE OF CORRECTION

PATENT NO. : 4,361,116

DATED : November 30, 1982

INVENTOR(S) : Peter KILHAM

It is certified that error appears in the above-identified patent and that said Letters Patent is hereby corrected as shown below:

Please correct the filing date of this application to read: --February 2, 1981--.

Signed and Sealed this

Fifteenth Day of July 1986

[SEAL]

Attest:

DONALD J. QUIGG

Attesting Officer

Commissioner of Patents and Trademarks